United States Patent
Higgins et al.

(10) Patent No.: US 7,481,474 B2
(45) Date of Patent: Jan. 27, 2009

(54) TRIM RETAINER

(75) Inventors: Lawrence John Higgins, Sterling Heights, MI (US); Steven Michael Benedetti, Sterling Heights, MI (US); Girishsingh A. Mokashi, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/371,340

(22) Filed: Mar. 8, 2006

(65) Prior Publication Data

US 2007/0210602 A1    Sep. 13, 2007

(51) Int. Cl.
*B60R 13/00* (2006.01)

(52) U.S. Cl. .............. 296/1.08; 296/39.1; 24/292; 24/297; 411/508

(58) Field of Classification Search ........... 296/1.08, 296/39.1, 146.7; 411/508–510; 24/292, 24/289, 297
See application file for complete search history.

(56) References Cited

U.S. PATENT DOCUMENTS

| | | | |
|---|---|---|---|
| 3,029,486 A | 4/1962 | Raymond | |
| 3,093,874 A * | 6/1963 | Rapata | 411/508 |
| 3,905,270 A | 9/1975 | Hehl | |
| D268,006 S | 2/1983 | Wollar | |
| 4,393,551 A | 7/1983 | Wollar et al. | |
| 4,422,276 A | 12/1983 | Paravano | |
| 4,427,328 A | 1/1984 | Kojima | |
| 4,431,355 A | 2/1984 | Junemann et al. | |
| 4,472,918 A | 9/1984 | Mach | |
| 4,489,465 A * | 12/1984 | Lemkin | 411/508 |
| 4,505,611 A | 3/1985 | Nagashima et al. | |
| 4,715,095 A | 12/1987 | Takahashi | |
| 4,778,320 A | 10/1988 | Nakama et al. | |
| 4,810,147 A | 3/1989 | Hirohata et al. | |
| 4,861,208 A | 8/1989 | Boundy | |
| 4,938,645 A | 7/1990 | Wollar | |
| 4,987,656 A | 1/1991 | Sato | |
| 5,011,356 A | 4/1991 | Fernandez et al. | |
| 5,039,267 A | 8/1991 | Wollar | |

(Continued)

FOREIGN PATENT DOCUMENTS

DE    2 250 729    3/1974

(Continued)

OTHER PUBLICATIONS

Drawing No. W703613—Ford Clip, Pnl Trim PSH IN (believed to have been offered for sale prior to Mar. 2006).

(Continued)

*Primary Examiner*—Dennis H Pedder
(74) *Attorney, Agent, or Firm*—Harness, Dickey & Pierce, P.L.C.

(57) ABSTRACT

A retainer employs a flexible arm with an internal rib. In another aspect of the present invention, a retainer has at least one generally triangularly shaped projection laterally extending from an arm. A further aspect of the present invention retainer provides a laterally enlarged member, a trim panel-retaining head and stem, a central post, one or more flexible wings flexibly spanning between a tip of the post and the laterally enlarged member, and an internal rib and/or at least a pair of generally angular extensions flexibly extending from each arm.

9 Claims, 4 Drawing Sheets

U.S. PATENT DOCUMENTS

| | | | |
|---|---|---|---|
| 5,046,223 | A | 9/1991 | Kraus et al. |
| 5,106,223 | A | 4/1992 | Kraus et al. |
| 5,152,582 | A | 10/1992 | Magnuson |
| 5,165,833 | A | 11/1992 | Watanabe et al. |
| 5,173,026 | A | 12/1992 | Cordola et al. |
| 5,191,513 | A | 3/1993 | Sugiura et al. |
| 5,217,337 | A | 6/1993 | Junemann et al. |
| 5,301,396 | A | 4/1994 | Benoit |
| 5,316,423 | A | 5/1994 | Kin et al. |
| 5,319,839 | A | 6/1994 | Shimajiri et al. |
| 5,322,402 | A | 6/1994 | Inoue et al. |
| D354,219 | S | 1/1995 | Shimajiri |
| D355,113 | S | 2/1995 | Shimajiri |
| 5,393,185 | A | 2/1995 | Duffy, Jr. |
| 5,468,108 | A | 11/1995 | Sullivan et al. |
| 5,507,610 | A | 4/1996 | Benedetti et al. |
| 5,551,817 | A | 9/1996 | Kanie et al. |
| 5,573,362 | A | 11/1996 | Asami et al. |
| 5,586,853 | A | 12/1996 | Poe |
| 5,592,719 | A | 1/1997 | Eto et al. |
| 5,651,634 | A | 7/1997 | Kraus et al. |
| 5,689,863 | A | 11/1997 | Sinozaki et al. |
| 5,694,666 | A | 12/1997 | Hamamoto et al. |
| 5,704,753 | A | 1/1998 | Ueno et al. |
| D390,776 | S | 2/1998 | Ueno |
| 5,724,709 | A | 3/1998 | Kittmann et al. |
| 5,775,859 | A | 7/1998 | Anscher |
| 5,851,097 | A | 12/1998 | Shereyk et al. |
| 5,975,820 | A | 11/1999 | Kirchen |
| 6,039,523 | A | 3/2000 | Kraus et al. |
| 6,209,178 | B1 | 4/2001 | Wiese et al. |
| 6,264,393 | B1 | 7/2001 | Kraus et al. |
| 6,287,043 | B1 | 9/2001 | Kraus et al. |
| 6,305,055 | B1 | 10/2001 | Castro |
| 6,336,768 | B1 | 1/2002 | Kraus et al. |
| D456,699 | S | 5/2002 | Nakanishi |
| 6,449,814 | B1 | 9/2002 | Dinsmore et al. |
| 6,572,317 | B2 | 6/2003 | Okada et al. |
| 6,910,840 | B2 * | 6/2005 | Anscher ...................... 411/41 |
| 2002/0028123 | A1 | 3/2002 | Miura et al. |
| 2005/0095084 | A1 | 5/2005 | Hansen |

FOREIGN PATENT DOCUMENTS

| | | |
|---|---|---|
| GB | 807726 | 1/1959 |
| GB | 1 384 839 | 2/1975 |
| GB | 2 125 878 | 3/1984 |
| GB | 2360322 | 9/2001 |
| WO | WO/03/093690 | 11/2003 |

OTHER PUBLICATIONS

Four (4) photographs of Ernhart Part No. 16803 (offered for sale prior to Mar. 2005).

Five (5) photographs of Ernhart Part No. 16872 (offered for sale prior to Mar. 2005).

Four (4) photographs of Ernhart Part No. 16363 (offered for sale prior to Mar. 2005).

Two (2) Photographs and one (1) Drawing of TRW Shark Fin Clip, Part No. 60006118A (offered for sale prior to Mar. 2005).

European Search Report dated Nov. 20, 2007, 10 pages.

* cited by examiner

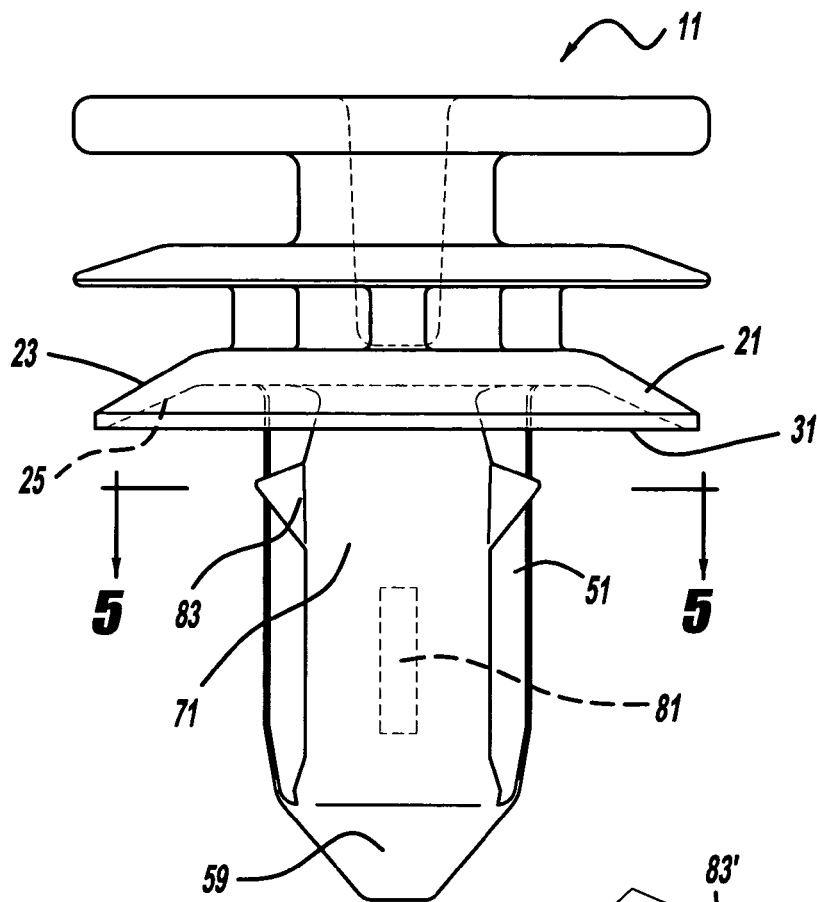
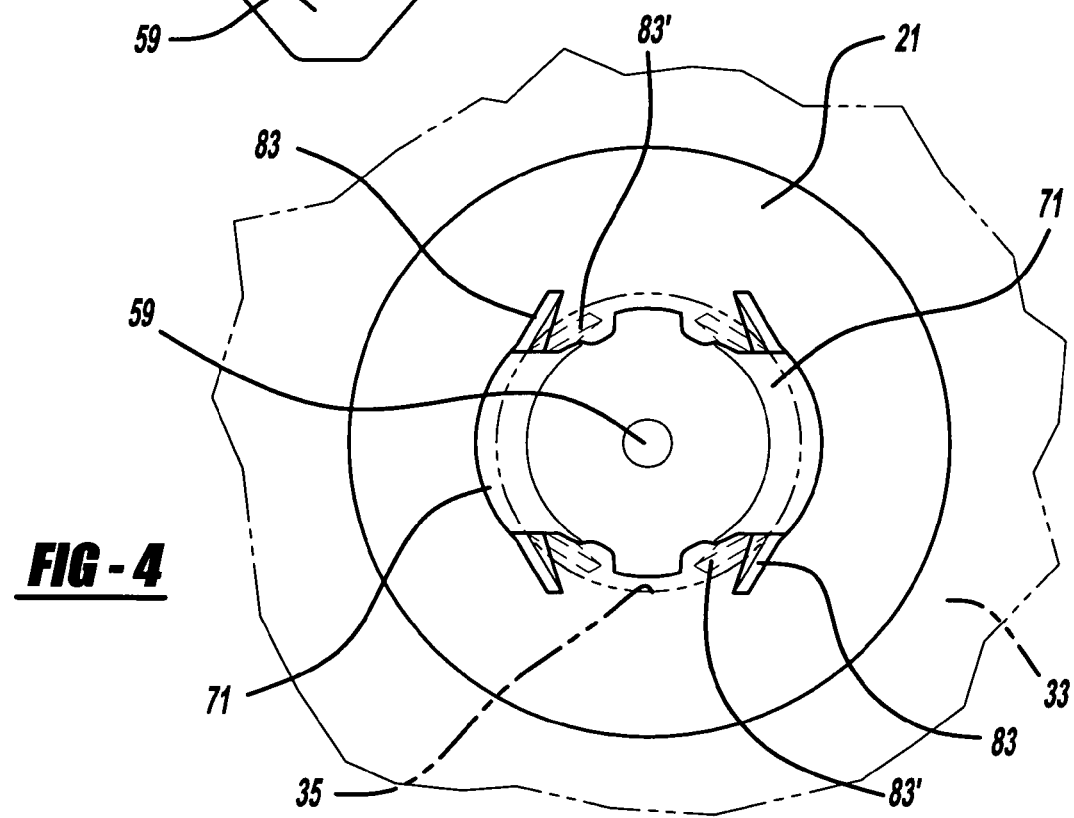

US 7,481,474 B2

TRIM RETAINER

BACKGROUND

The present application relates generally to fasteners and more particularly to an automotive vehicle trim retainer.

Conventional polymeric fasteners have been used in the automotive industry to retain interior trim panels to sheet metal structure. Examples of such traditional fasteners are disclosed in the following U.S. Pat. No.; 5,592,719 entitled "Fastening Clip" which issued to Eto et al. on Jan. 14, 1997; U.S. Pat. No. 5,573,362 entitled "Fastener Including Elastic Legs for Retaining the Fastener in a Mounting Hole" which issued to Asami et al. on Nov. 12, 1996; and U.S. Pat. No. 5,301,396 entitled "Fastener Assembly with Compression Member" which issued to Benoit on Apr. 12, 1994; all of which are incorporated by reference herein. Known fasteners such as these have unsuccessfully attempted to provide desirable insertion versus extraction forces while also achieving self-centering and over-compression resistance. Moreover, many conventional polymeric fasteners are not acceptably reusable after removal from the often sharp, sheet metal hole edges.

SUMMARY

In accordance with the present invention, a retainer employs a flexible arm with an internal rib. In another aspect of the present invention, a retainer has at least one generally triangularly shaped projection laterally extending from an arm. A further aspect of the present invention retainer provides a laterally enlarged member, a trim panel-retaining head and stem, a central post, one or more flexible wings flexibly spanning between a tip of the post and the laterally enlarged member, and an internal rib and/or at least a pair of generally angular extensions flexibly extending from each arm.

The retainer of the present invention is advantageous over conventional fasteners in that the ribs of the present invention deter the arm from taking an undesired "set" by not allowing each arm to become over-compressed or collapse more than is desired to clear the sheet metal hole into which the retainer is designed for. Furthermore, the generally triangular projections or angular extensions assist in achieving somewhat higher and more consistent extraction forces over a greater range of reusability as compared to prior door trim retainers. Additional advantages and features of the present invention will become apparent from the following description and appended claims, taken in conjunction with the accompanying drawings.

BRIEF DESCRIPTION OF THE DRAWINGS

FIG. 3 is a side elevational view, taken 90 degrees to that of FIG. 2, showing the preferred embodiment retainer;

FIG. 4 is an end elevational view, viewed from a tip, showing the preferred embodiment retainer, with the solid lines indicating its free condition and the dashed lines indicating its compressed insertion condition;

DETAILED DESCRIPTION OF THE PREFERRED EMBODIMENT

Figure 1:
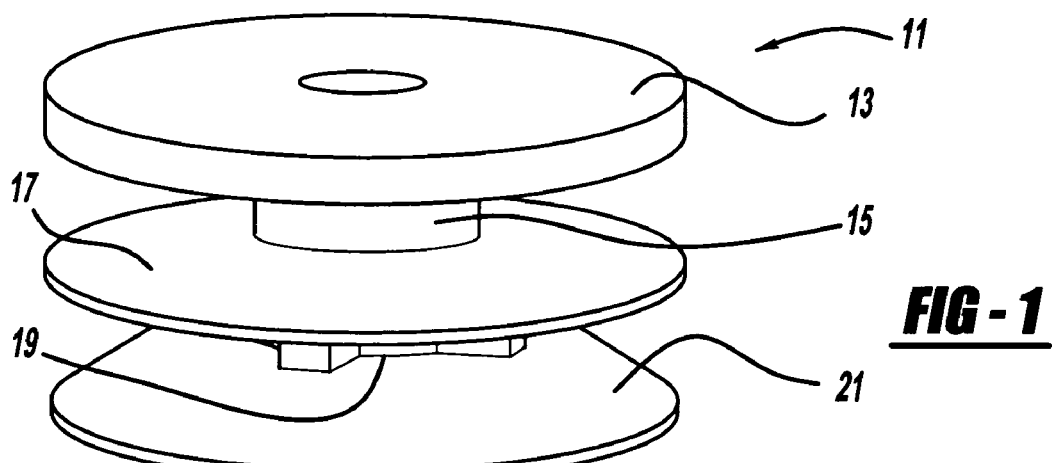
FIG. 1 is a prospective view showing the preferred embodiment of a trim retainer of the present invention.
Figure 2:
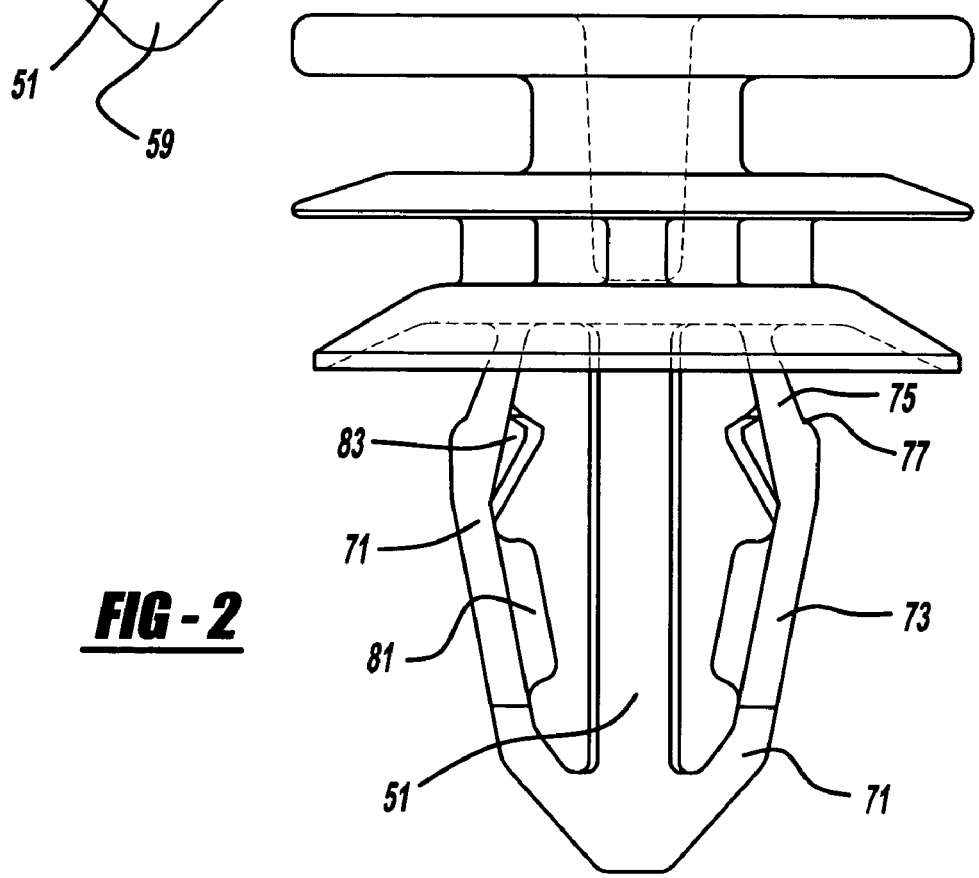
FIG. 2 is a side elevational view showing the preferred embodiment retainer disposed in a free condition.
Figure 5:
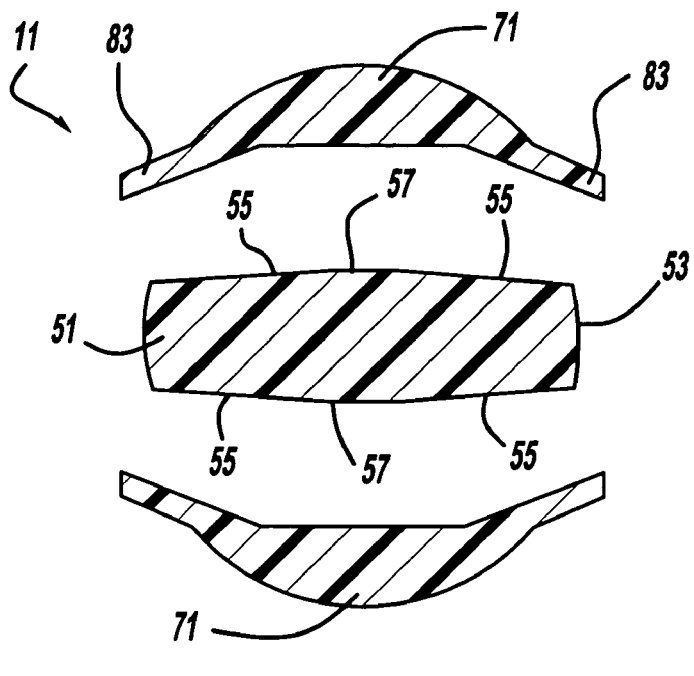
FIG. 5 is a cross sectional view, taken a long line 5-5 of FIG. 3, showing the preferred embodiment retainer.

Referring to FIGS. 1-3, 5 and 7, a trim retainer or fastener 11 has a first circular head 13, a circular-cylindrical stem 15, a circular second head 17, a second stem 19 and a laterally enlarged umbrella 21. Second stem 19 has a circular-cylindrical central section bordered by four radially extending supports, each having a generally rectangular cross sectional shape. Umbrella 21 is somewhat flexible, has a tapered top surface 23, and has a somewhat concave and undercut bottom surface 25. A dog house 27 of an interior trim panel 29 is removable affixed to first stem 15 between first and second heads 13 and 17, respectively. Furthermore, a lower edge 31 of umbrella 21 seals against a face of a structural body panel 33 to deter transmission of moisture through a hole 35 and body panel 33.

A post 51 centrally and coaxially extends from the bottom of umbrella 21. Post 51 has a typical cross sectional shape defined by opposite lateral edges 53, each having a slightly curved configuration, and slightly tapered and somewhat flat internal segments 55 connected to middle flat segments 57. A tapered tip 59 is located at a leading end of post 51 opposite umbrella 21. An arm 71 flexibly spans between a leading end of post 51 adjacent tip 59 and bottom surface 25 of umbrella 21. It is alternately envisioned that a trailing end of arm 71 is flexibly connected to the trailing end of post 51 although the performance may not be as desirable as with the preferred embodiment. Returning to the preferred embodiment, post 51 is elongated in a longitudinal direction and arm 71 is also predominately elongated in the longitudinal direction but defined by a first lead in angled segment 73 and a reversed angled securing segment 75. There are two arms 71 which are in mirrored symmetry to each other, and separated by post 51. An external notch 77 is located on each arm 71 between umbrella 21 and an intersection (i.e., offset angled interface) between segments 73 and 75.

An internally projecting rib 81 extends in a somewhat longitudinally elongated manner from an inside surface of each arm 71. Each rib 81 has a generally rectangular cross sectional shape of less lateral width than the adjacent segment of the arm. Furthermore, a pair of angular extension wings 83, of generally triangular shape, laterally and circumferentially project from lateral edges of each arm 71. Retainer 11 is preferably injection molded from an impact modified acetal copolymer plastic material, however, it should be appreciated that other materials may alternately be employed.

Figure 6:
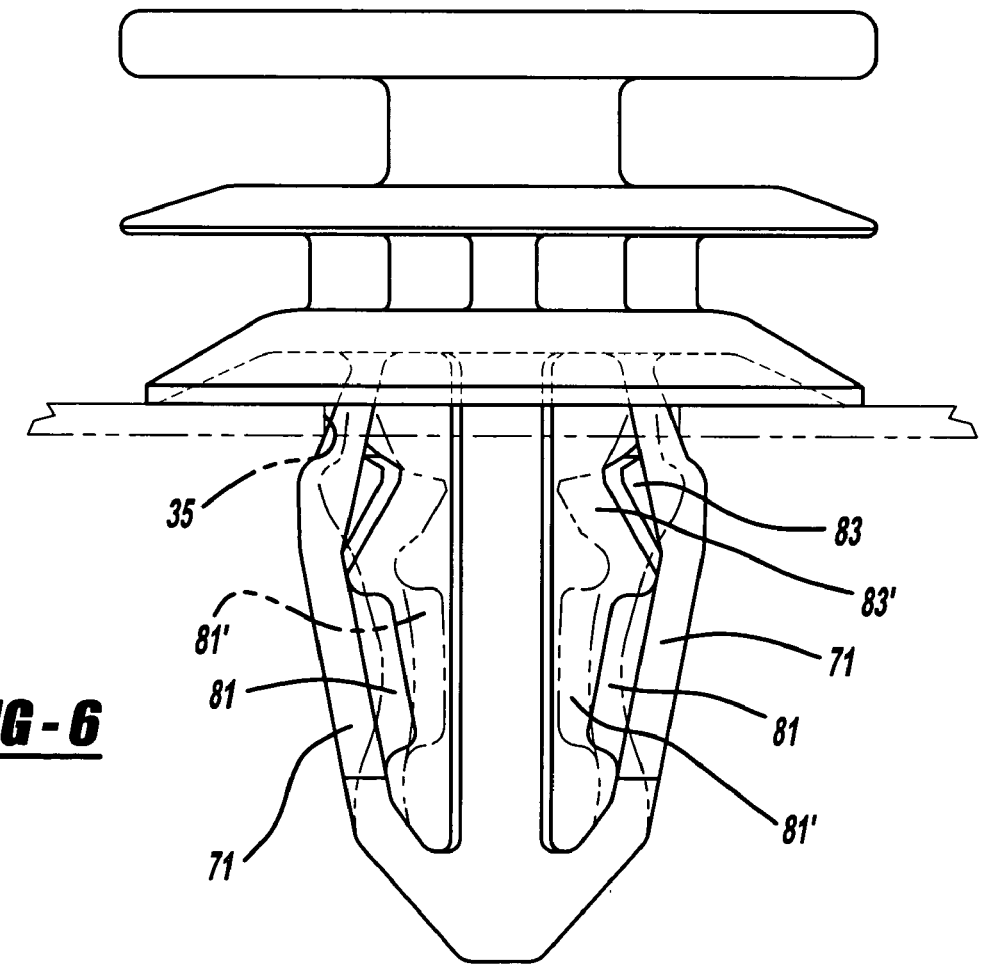
FIG. 6 is a side elevational view, like that of FIG. 2, showing the preferred embodiment retainer, with the solid lines indicating its free condition and the phantom lines indicating its compressed insertion condition.
Figure 7:
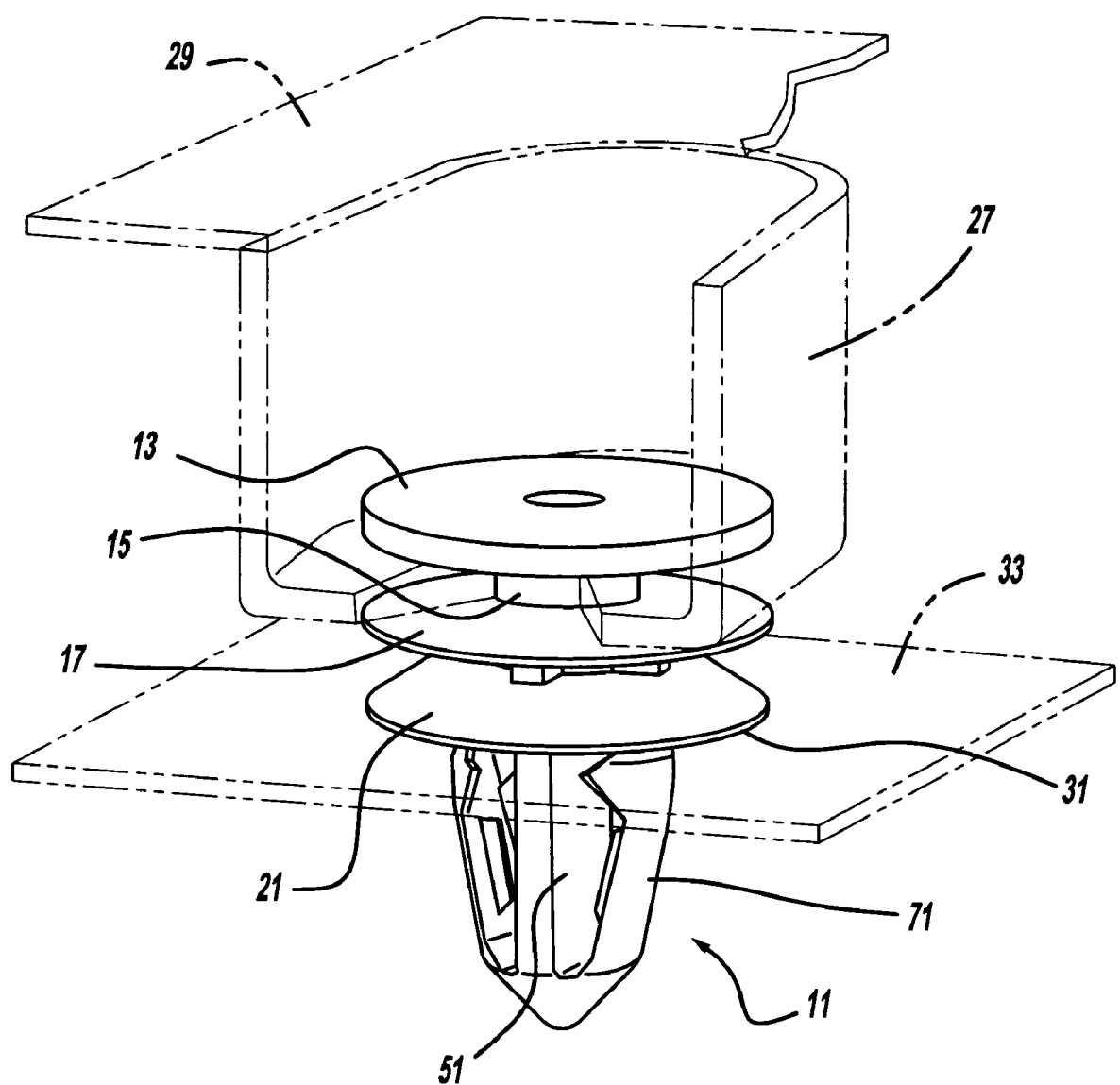
FIG. 7 is a perspective view showing the preferred embodiment retainer fastening an interior trim panel to an automotive vehicle body panel.

During use, an automotive vehicle, interior trim panel, such as an interior door trim panel, is secured to the heads and stem of retainer 11. Stem 15 is snapped in a sliding manner into a key-holed opening in dog house 27, as is shown in FIG. 7. Thereafter, tip 59 of retainer 11 is aligned with hole 35 in sheet metal body panel 33 (for example, a structural door panel or quarter inner panel). This can best be observed in FIGS. 4, 6 and 7. Trim panel 29 is then manually pushed toward body panel 33 such that contact of an internal edge of hole 35 against leading segment 73 of each arm 71 caused inward flexure of each arm 71 towards post 51. Thus, rib 81 is moved from its free position to a compressed position 81' as can be seen in FIG. 6. An internal edge of each rib 81' operably contacts against a generally parallel segment 57 (see FIG. 5) of post 51 to deter over-compression and setting of each arm 71. Body panel 33 rides against leading edges of wings 83 there by being inwardly flexed to positions 83' (see FIG. 4) relative to the adjacent arm segment passing through hole 35. Arms 71 and wings 83 return substantially to their free positions, but with slight compression, when retainer 11 is fully inserted into body panel 33, as shown in FIG. 6. It is noteworthy that the slightly tapered segments 55 of post 51 allow for the inward flexure of wings 83 while the middle segments 57 operably abut against ribs 81 when arms 71 are fully compressed. Thus, significantly improved extraction force consistency, improved reusability performance, insertion self-centering and minimization of arm setting are possible with the present invention.

While certain aspects of the trim retainer have been disclosed, it should be appreciated that other variations maybe employed. For example, a trim retainer of the present invention can be used for securing other automotive vehicle components, such as and not be limited to, garnish moldings, package shelves, sail trim panels, headliners, lamps, trunk trim and the like. Moreover, slightly different wing, rib, arm, post and other shapes may be provided, such as with additional radii and the like, although various advantages of the present invention may not be realized. It should also be appreciated that the present invention ribs may or may not be used in combination with the present invention wings, although various advantages of the present invention may not be realized. Additionally, the post and tip may extend longitudinally beyond the leading intersection of the arms to provide an additional alignment and locating feature prior to full insertion, although again, all of the advantages of the present invention may not be provided. It is alternately envisioned that more or less heads and wings may be included, although various advantageous of the present invention may not be utilized. It is intended by the following claims to cover these and any other departures from the disclosed embodiments which fall within the true spirit of this invention.

The invention claimed is:

1. A method of using a fastener with an automotive vehicle trim panel and a structural body panel, the method comprising;
   (a) attaching the fastener to the automotive vehicle trim panel;
   (b) inserting a tapered tip of the fastener into a hole of the body panel;
   (c) flexing at least a pair of arms extending from the tip inwardly toward each other during step (b);
   (d) deterring compression of the arms at least in part by an internal rib extending from each of the arms; and
   (e) inwardly flexing projections triangularly extending adjacent opposite lateral edges of each arm, the projections being spaced from the rib on each arm, relative to each arm, during step (b).

2. The method of claim 1 further comprising making the retainer as a single piece from polymeric material.

3. The method of claim 1 wherein the ribs abut against a central post, and each rib is elongated in an elongated direction of each corresponding arm.

4. An automotive vehicle apparatus comprising:
   (a) a vehicular trim member;
   (b) a fastener attachable to the trim member, the fastener comprising:
      i. a central post elongated in a longitudinal direction;
      ii. a laterally enlarged member affixed adjacent a trailing end of the post;
      iii. at least a pair of elongated arms each having a first end flexibly coupled to the post and a second end flexibly connected adjacent the laterally enlarged member;
      iv. an elongated rib internally extending from each of the arms, each rib being spaced away from the post when in its free position and being moved to an inward position toward the post during arm insertion; and
      v. two substantially triangular projections laterally extending from opposite side edges of each of the arms and spaced from the rib.

5. The apparatus of claim 4 wherein the laterally enlarged member, post and arms are all a single polymeric material piece.

6. The apparatus of claim 4 wherein the post has substantially flat surface segment facing at least one of the arms.

7. The apparatus of claim 4 further comprising a first stem and a first head coupled to the laterally enlarged member by the first stem, and the laterally enlarged member having a substantially concave shape adjacent the post.

8. The apparatus of claim 4 wherein the triangular projections are located adjacent an exterior notch on each arm.

9. The apparatus of claim 4 wherein each rib is elongated in an elongated direction of the respective arm and has a lateral cross section smaller than that of the adjacent segment of the arm.

* * * * *